United States Patent [19]

von Tobel et al.

[11] Patent Number: 4,699,626

[45] Date of Patent: Oct. 13, 1987

[54] MIXTURES OF COPPER COMPLEXES OF DISAZO COMPOUNDS: 4,4'-(3,3'-DIHYDROXYBIPHENYLENE) TETRAZO COMPONENT AND DISULFONAPHTHOL AND 3-SULFO-6-(2'-CHLORO-4'-CHLORO OR HYDROXY-1,3,5-TRIAZIN-6'-YLAMINO)-NAPHTH-1-OL COUPLING COMPONENT

[75] Inventors: Hans-Rudolf von Tobel, Riehen; Paul Doswald, Münchenstein, both of Switzerland

[73] Assignee: Sandoz Ltd., Basel, Switzerland

[21] Appl. No.: 838,860

[22] Filed: Mar. 12, 1986

[30] Foreign Application Priority Data

Mar. 18, 1985 [DE] Fed. Rep. of Germany ....... 3509650

[51] Int. Cl.⁴ .................... C09B 35/08; C09B 45/28; C09B 62/09; D06P 1/38
[52] U.S. Cl. .......................................... 8/549; 8/641; 8/681; 8/685; 8/686; 8/688; 8/918; 8/624; 534/719
[58] Field of Search .................... 8/549, 641, 681, 686

[56] References Cited

U.S. PATENT DOCUMENTS 2,649,354  8/1953  Hemmi et al. ........................... 8/551
4,054,559 10/1977  Aoki et al. ............................ 534/719
4,410,652 10/1983  Robinson et al. .................... 524/195

FOREIGN PATENT DOCUMENTS 895289  3/1972  Canada .
877249  9/1961  United Kingdom .

*Primary Examiner*—A. Lionel Clingman
*Attorney, Agent, or Firm*—Gerald D. Sharkin; Richard E. Vila; Melvyn M. Kassenoff

[57] ABSTRACT

Complexes of the formula

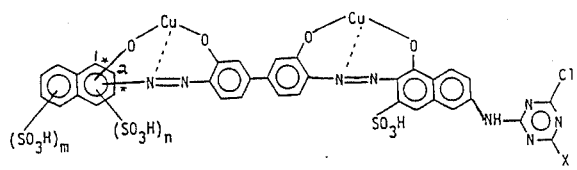

or a water-soluble salt thereof each cation of which is independently a non-chromophoric cation, wherein:
X is chloro or hydroxy,
$m$ is 1 or 2, and
$n$ is 0 or 1,
with the proviso that $m+n$ is 2,
with the proviso that one of the asterisked bonds is in the 1-position and the other asterisked bond is in the 2-position, and mixtures thereof, are useful for dyeing or printing hydroxy group- or nitrogen-containing organic substrates, preferably textile material consisting of or containing cellulose fibers, most preferably cotton, alone or blended with other suitable textile fibers. The resulting dyed or printed textile material may be after-treated with a polymeric polybasic amino compound in order to improve the wet fastness properties of these dyeings and printings.

20 Claims, No Drawings

MIXTURES OF COPPER COMPLEXES OF DISAZO COMPOUNDS: 4,4'-(3,3'-DIHYDROXYBIPHENYLENE) TETRAZO COMPONENT AND DISULFONAPHTHOL AND 3-SULFO-6-(2'-CHLORO-4'-CHLORO OR HYDROXY-1,3,5-TRIAZIN-6'-YLAMINO)-NAPHTH-1-OL COUPLING COMPONENT

This invention relates to metallised disazo compounds containing a chlorotriazinyl group-, to a process for their preparation and processes for dyeing or printing hydroxy group or nitrogen-containing organic substrates using these compounds in conventional manner and to special aftertreatment of the resulting dyeings and prints.

According to the invention there is provided a metallised disazo compounds of formula I,

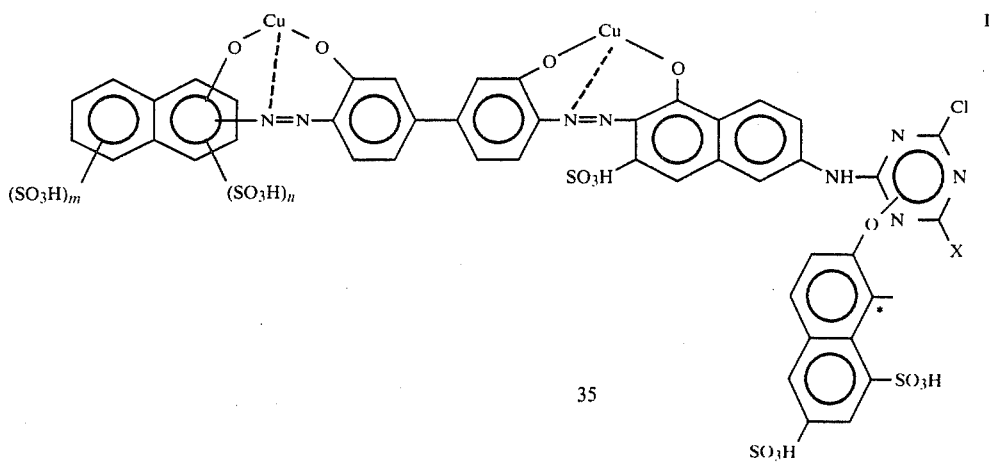

in free acid or salt form, in which
m is 1 or 2,
n is 0 or 1, and
the sum of (m+n) is 2;
the azo group is bound to the 1- or 2-position of the naphthyl group, and the group —O— (in ortho-position to the azo group) is bound to the 2- or 1-position of the naphthyl group, and
X is chlorine or hydroxy,
and mixtures of compounds of formula I.

The disulphonaphthol group is preferably a group of formula (a), (b), (c) or (d),

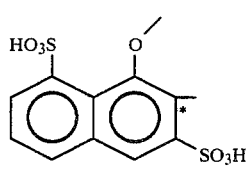

(a)

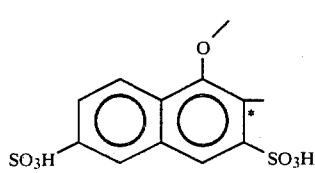

(b)

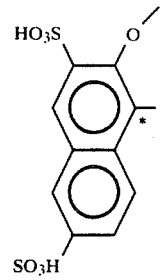

(c)

(d)

in which the asterisked carbon atom is bound to the azo group. More preferably, it is a group of formula (a) or a mixture of the groups of formulae (a) and (c). Most preferably, it is a group of formula (a).

Preferred compounds of formula I are those which contain a group of formula (a) and in which X is chlorine or hydroxy; or those which are a mixture of compounds of formula I in which X is chlorine or hydroxy and which contain on the one hand a group of formula (a) and, on the other hand a group of formula (c), and which compounds forming the mixture are preferably present in a ratio (by weight) of from 85:15 to 15:85.

Furthermore, it is preferred that the compounds of formula I are a mixture containing a compound of formula I in which X is chlorine (component Ia) together with a compound of formula I having an identical or different chromophore in which X is hydroxy (component Ib). Such mixtures preferably contain the components Ia and Ib in a ratio (by weight) of from 9:1 to 1:9; more preferably they contain the components Ia:Ib in a ratio (by weight) of from 9:1 to 7:3. It is further preferred that the chromophores of component Ia and component Ib are identical.

When a compound of formula I is in salt form, the cation associated with the sulpho groups is not critical and may be any one of those non-chromophoric cations conventional in the field of anionic direct dyestuffs provided that the corresponding salts as obtained are water-soluble. In a compound of formula I the cations of the sulpho groups can be the same or different, e.g., the compound of formula I can be in a mixed salt form. Preferably, the cations of the sulpho groups are identical.

Examples of suitable cations are alkali metal cations and unsubstituted and substituted ammonium cations, e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

The present invention further provides a process for the preparation of the compounds of formula I.

Compounds of formula I in which X is chlorine and mixtures thereof are prepared by a process comprising reacting a compound of formula II,

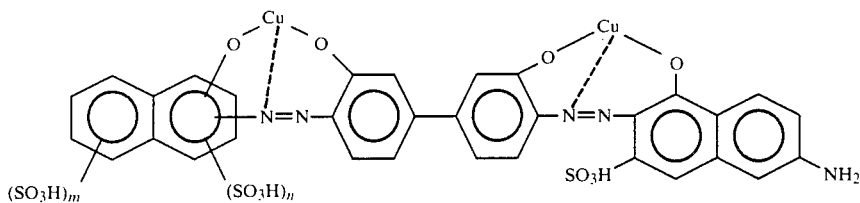

which compound is in free acid or salt form, or a mixture of two or more compounds of formula II with cyanuric chloride.

Compounds of formula I in which X is hydroxy or a mixture of chlorine and hydroxy are prepared by reacting a compound of formula II or a mixture of compounds of formula II with a cyanuric chloride and subsequent replacement of one of the chlorine atoms bound to the triazine group with hydroxy totally or only partially by alkaline saponification.

The condensation of the amine group in a compound of formula II with cyanuric chloride as well as any subsequent saponification of one of the chlorine atoms may be effected in accordance with conventional methods.

The compounds of formula I may be isolated in accordance with known methods, for example, by conventional salting out with alkali metal salt, filtering and drying in vacuo at elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

The starting compounds of formula II are either known or may be prepared in accordance with known methods by diazotising the amine groups of ortho-dianisidine on both sides, reacting first on one side and then on the other side with the corresponding coupling components followed by carrying out the demethylating coppering.

The compounds of formula I, preferably in salt form, and mixtures thereof are useful for dyeing or printing hydroxy group- or nitrogen-containing organic substrates, preferably textile material consisting of or containing cellulose fibres. The preferred substrate is cotton or regenerated cellulose, particularly cotton, which also may be blended together or individually with other suitable textile fibres.

The compounds and mixtures according to the invention in view of their high substantivity are suitable for use as direct dyes. Dyeing and printing may be effected in accordance with conventional processes. Dyeing of natural or regenerated cellulose, such as cotton, is preferably carried out using the conventional exhaust dyeing method at temperatures of from 50° to 100° C.

The dyestuffs of this invention have high colouring strength and give high exhaust and fixation yields. They are well compatible with other dyestuffs and may be applied per se or in combination with appropriate dyestuffs of the same class showing similar dyeing properties. The dyeings obtained with such combination mixtures have good fastness properties.

Generally, the dyeings and prints obtained on the above mentioned substrates show good wet fastness properties (such as fastness to water, washing or sweat) and good light fastness. Furthermore, they are stable to any oxidative influences, e.g., chlorinated water, hypochlorite bleach, peroxide and or perborate containing wash liquors.

The wet fastness properties of the direct dyeings and prints on textile material consisting of or containing cellulose fibres, particularly cotton, made with the compounds of formula I may be further improved by a special aftertreatment with a polymeric polybasic amino compound (A). Particularly, this aftertreatment gives improved wash fastness properties allowing repeated washing at 60° C.

As a polymeric polybasic amino compound (A) preferably a compound (A1) is used which is the reaction product of an amine of formula V

$$R-NH-R \qquad V$$

or, more preferably, of a polyalkylene polyamine of formula VI

$$RRN-(Z-X_o)_p-Z-NRR \qquad VI$$

in which
each R is independently hydrogen, unsubstituted $C_{1-10}$alkyl or $C_{1-10}$alkyl monosubstituted by hydroxy, $C_{1-4}$alkoxy or cyano,
p is a number from 0 to 100,
Z, or each Z when p>0, is independently $C_{2-4}$alkylene or $C_{2-4}$hydroxyalkylene, and
$X_o$, or each $X_o$ when p>1, is independently —O—, —S— or —NR— where R is as defined above,
provided that the amine of formula VI contains at least one reactive >NH or —NH₂ group, with cyanamide, dicyandiamide (DCDA), guanidine or biguanide.

Most preferred as the compound of formula VI are diethylene triamine, triethylene tetramine, tetraethylene pentamine, 2-aminoethyl-3-aminopropylamine, dipropylene triamine and N,N-bis-(3-aminopropyl)methylamine.

The compounds (A1) are known; they may be prepared, for example, according to the method described in British Patent No. 657,753, U.S. Pat. No. 2,649,354 or U.S. Pat. No. 4,410,652.

Most preferred as compounds (A1) are the reaction products of DCDA with diethylene triamine or triethylene tetramine.

Preferred compounds (A) are furthermore compounds (A2) which are reaction products of compounds (A1) with epihalohydrin or a precursor thereof, especially epichlorohydrin.

Such products are described in U.S. Pat. No. 4,439,203, the disclosure of which is incorporated herein by reference.

A further group of preferred compounds (A) are the compounds (A3) which are the reaction products of compounds (A1) with an organic compound (B) containing at least two groups capable of being split off as anions on reaction with (A1).

Preferred compounds (B) correspond to formula VII, VIII or IX,

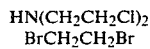

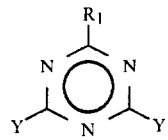

in which both Y's are identical and are chlorine or bromine, $R_1$ is Cl or $-NHCH_2CH_2CH_2N^{\oplus}(CH_3)_3 An^{\ominus}$ where $An^{\ominus}$ is $Cl^{\ominus}$ or $CH_3SO_4^{\ominus}$.

A further group of preferred compounds (A) are the compounds (A4) which are obtained by reacting epihalohydrin or a precursor thereof with a polyalkylene polyamine (C). Preferred compounds (A4) are the reaction products of 1.5-2.5 moles of epichlorohydrin with 1 mole of a polyalkylene polyamine (C) corresponding to formula X,

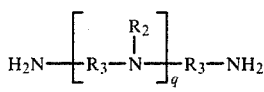

in which
q is a number from 1 to 5,
each $R_3$ is independently $C_{2-4}$alkylene, and
each $R_2$ is independently phenyl, $C_{1-4}$alkyl or $C_{1-4}$alkyl monosubstituted by hydroxy, $C_{1-4}$alkoxy, halogen or phenyl.

The aftertreatment of the dyed or printed substrates with compound (A) is preferably carried out at a pH from 8 to 12, most preferably from 10 to 11. It may be a continuous process, for example padding, dipping, spraying or foam finishing, but is preferably a batchwise exhaust process. The aftertreatment is usually carried out at temperatures from 20°-190° C., preferably at 30°-70° C. for 3 to 60 minutes, preferably 5 to 20 minutes, preferably in the presence of 5 to 10 g/l of an electrolyte, e.g. sodium chloride or sodium sulphate. The quantity of compound (A) used will depend upon the depth of dyeing of the substrate, but in general from 0.1 to 6%, preferably 1 to 2%, based on the dry weight of substrate may be suitable. The pH of the aftertreatment bath may be adjusted by addition of alkali metal carbonate or hydroxide, preferably sodium or potassium carbonate or hydroxide. The liquor to goods ratio of the aftertreatment bath may be from 2:1 to 50:1, and the dyed or printed substrate may be dried before aftertreatment.

In a preferred aftertreatment process, the dyed or printed substrate is added at room temperature to a bath containing the required amount of compound (A) and 5 to 10 g/l of electrolyte, and adjusted with sodium carbonate to pH 10-11. Within 10 minutes the bath is raised to 60° C. and the substrate is treated at this temperature for 20 minutes. Finally, the aftertreated substrate is rinsed, optionally neutralised, and dried.

Dyeings and prints aftertreated according to the invention give better wet fastness properties than untreated dyeings.

The following examples in which parts and percentages are by weight or volume unless otherwise stated, and temperatures are in degrees Centigrade, illustrate the subject matter of the invention. Percentage figures for components of a dyebath or treatment bath are based on the dry weight of substrate.

EXAMPLE 1

32 Parts of ortho-dianisidine as hydrochloride (=0.1 mole) are stirred with 30 parts of water and 30.5 parts of 30% hydrochloric acid are added. Diazotisation on both sides is effected at 7°-10° by the dropwise addition of 36 parts of a 40% sodium nitrite solution. After 60 minutes the diazotisation reactions are completed. Any excess nitrous acid is then decomposed by the addition of a small amount of sulphamic acid. Finally, the reaction solution is adjusted to pH 7.

First coupling is effected on one side. For this coupling 30 parts of 1-hydroxynaphthalene-3,8-disulphonic acid (0.1 mole) which are dissolved in 300 parts of water containing 0.2 moles sodium hydroxide are added dropwise to the diazo solution within 20 minutes at 0°-3°. The pH of the reaction mixture is kept at 7.5-8 by adding a 20% sodium carbonate solution. After the monocoupling is complete, 24 parts of 2-amino-5-hydroxynaphthalene-7-sulphonic acid are sprinkled into the mixture. The temperature is raised from 3° to 20°, and the pH is kept at 9-9.5 by adding a 20% sodium carbonate solution. After ca. 30 minutes the second coupling is completed.

Subsequently, the demethylation coppering is carried out. The reaction solution is heated to 80°, and 5% by volume of diethanolamine is added. To this mixture a tetrammine copper (II) salt solution (containing 14 parts of $Cu^{2+}$ ions=0.22 mole equivalents) is added dropwise at 90°-95° within 10 to 20 minutes. Coppering is effected at 94°-96° for 24 hours. The resultant copper complex is isolated by salting out at 70°-80° with 8% sodium chloride and adjusting to pH 7-8 with hydrochloric acid. The reaction mixture is filtered at 50°-60° and the obtained filter cake is washed with a 10% sodium chloride solution.

The filter cake thus washed with squeezed out is stirred into 1000 parts of water. At 0°-5° a suspension of 18.5 parts of cyanuric chloride (0.1 mole) in ice water is added. After approximately one hour at pH 6-7 the condensation is completed. The dyestuff is salted out with 5% sodium chloride, filtered and dried at 50°-60° in vacuo. The obtained dyestuff corresponds (in free acid form) to the formula

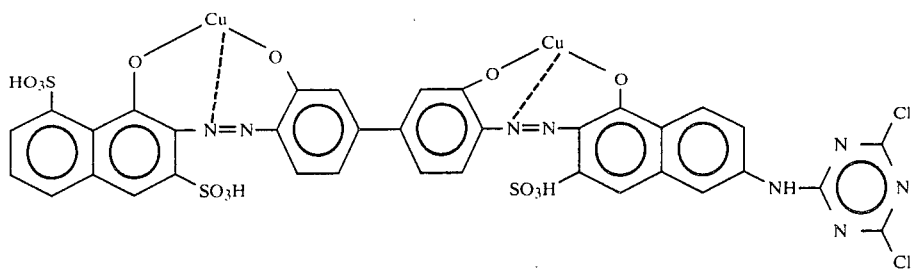

it dyes cotton a navy blue shade.

EXAMPLE 2

When the dyestuff obtained according to the method described in Example 1 is heated for one hour at ca. 60° in an alkaline medium at pH 12, one chlorine atom is replaced with hydroxy by alkaline hydrolysis. The corresponding dyestuff containing the group

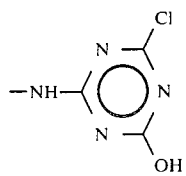

is obtained which is isolated in analogous manner as described in Example 1 and dried at 100°. The dyestuff dyes cotton a navy blue shade.

In the following examples the application of the compounds of this invention and the aftertreatment of the resulting dyeings with a polymeric compound (A) is illustrated. Polymer polybasic compounds (A) suitable as fixing agent are as follows:

(Aa1) Product (A) of Example 1 of U.S. Pat. No. 4,410,652.
(Aa2) The product of Example 1 of U.S. Pat. No. 4,439,203.
(Aa3) The product of Example 1 of published British Patent Application No. 2,154,615A.

APPLICATION EXAMPLE I 0.5 Parts of the dyestuff of Example 1 or 2 are dissolved in 200 parts of demineralised water. The dyebath is heated to 50°–60°, then 10 parts of cotton cretonne fabric (bleached) are added. Within 30 minutes the temperature is elevated to 98°. At this temperature 1 part and after 10 minutes further 2 parts of Glauber's salt (calcined) are added, and the dyeing temperature is kept at 98° for 35 minutes. Finally, the dyebath is cooled to 80° within 15 minutes. Water that evaporates during the dyeing process is continuously replaced by demineralised water at 98°. The dyeing is rinsed with running cold water, centrifuged and dried at 80°. The obtained cotton dyeing in both cases is navy blue.

APPLICATION EXAMPLE II

100 Parts of cotton woven fabric (bleached) are dyed in conventional manner, for example according to the method given in Application Example I, with 3 parts of the dyestuff of Example 1 or 2. The dyed substrate is then aftertreated, without an intermediate drying step, for 20 minutes at 60° at a liquor to goods ratio of 20:1 in an aqueous bath containing 2 parts of the polymeric compound (Aa1) and 6 g/l sodium carbonate, giving a pH of 11.0. Finally the substrate is rinsed with cold water and dried.

The aftertreated navy blue cotton dyeing has good wash fastness properties and is resistant to washing at the boil.

When in Application Example II product (Aa1) is replaced with corresponding amounts of products (Aa2) or (Aa3), similar good results are obtained. The aftertreated cotton dyeings in view of their good wash fastness properties resist repeated washing processes.

EXAMPLES 3 TO 18

By analogy with the method described in Examples 1 and 2, using appropriate starting compounds, further compounds of formula I or mixtures thereof can be prepared which are listed in the following Table. The varying coupling component is defined under the column showing the symbol KK. When X is defined as a mixture of chlorine and hydroxy, this mixture results from a saponification reaction according to the method given in Example 2 which may be effected partly. Since this saponification step can be interrupted at any time, it is possible to prepare dyestuff mixtures containing any ratio Cl:OH as indicated in the Table. When, for example, a mixture shows a ratio Cl:OH=7:3 it means that in the dyestuff mixture 7 parts of the corresponding dyestuff containing dichlorotriazinyl group and 3 parts of the dyestuff containing a chloro-hydroxytriazinyl group are present. The dyestuffs and mixtures according to Examples 3 to 18 give navy blue dyeings on cotton.

TABLE

| Ex. No. | KK | X (ratio) |
|---|---|---|
| 3 | ![group a structure: naphthalene with HO3S, O, SO3H] = group (a) | Cl/OH (7:3) |
| 4 | group (a) | Cl/OH (8:2) |
| 5 | group (a) | Cl/OH (9:1) |
| 6 | 85 parts of group (a) and 15 parts of ![group c structure: naphthalene with HO3S, O, HO3S] = group (c) | Cl |

TABLE-continued

| Ex. No. | KK | X (ratio) |
|---|---|---|
| 7 | 85 parts of group (a) and 15 parts of 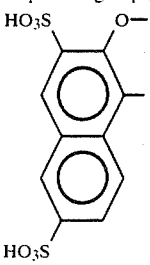 = group (c) | OH |
| 8 | 85 parts of group (a) and 15 parts of 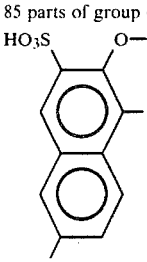 = group (c) | Cl/OH (7:3) |
| 9 | 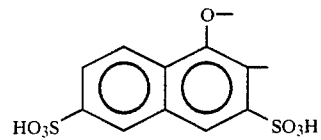 = group (b) | Cl |
| 10 | group (b) | OH |
| 11 | group (b) | Cl/OH (8:2) |
| 12 | group (c) | Cl |
| 13 | group (c) | Cl/OH (7:3) |
| 14 | 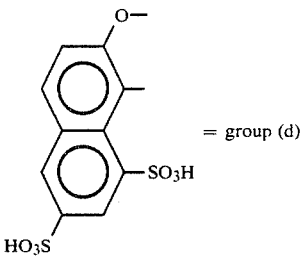 = group (d) | Cl |
| 15 | group (d) | OH |
| 16 | group (d) | Cl/OH (9:1) |
| 17 | 75 parts of group (a) and 25 parts of group (c) | Cl |
| 18 | 75 parts of group (a) and 25 parts of group (c) | Cl/OH (8:2) |

In accordance with the method as described the dyestuffs and dyestuff mixtures according to Examples 1 to 18 are obtained in sodium salt form. They may, depending on the reaction and isolation conditions or by reacting the sodium salts in accordance with known methods, also be obtained in free acid form or in other salt forms, for example those salt forms containing one or more cations indicated in the description above. It is also possible to prepared mixed salt forms.

The dyestuffs of Examples 3 to 18 may be applied in analogous manner to Application Example I and aftertreatment according to Application Example II; the thus obtained cotton dyeings have improved wash fastness properties.

What is claimed is:

1. A mixture of complexes of the formula

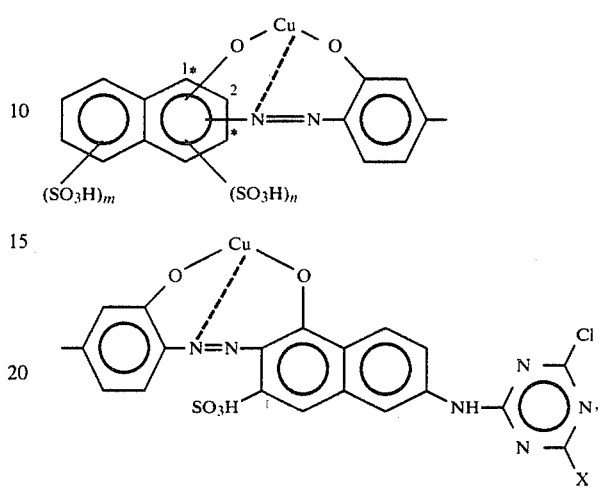

or water-soluble salts thereof each cation of which is independently a non-chromophoric cation, wherein X is chloro or hydroxy, m is 1 or 2, and n is 0 or 1, with the proviso that m+n is 2, with the proviso that one of the asterisked bonds is in the 1-position and the other asterisked bond is in the 2-position, said mixture containing at least two complexes of said formula or water-soluble salts thereof each cation of which is independently a non-chromophoric cation differing with respect to (1) X, (2) the positions of the substituents on the asterisked naphthalene ring or (3) both (1) and (2).

2. A mixture according to claim 1 wherein each cation is independently lithium, sodium, potassium, ammonium, methylammonium, dimethylammonium, trimethylammonium, tetramethylammonium, triethylammonium, ethanolammonium, diethanolammonium or triethanolammonium.

3. A mixture according to claim 2 wherein each cation is sodium.

4. A mixture according to claim 1 wherein each

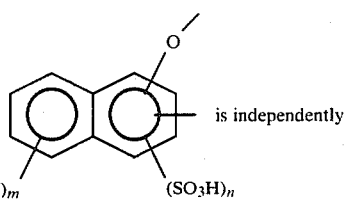 is independently

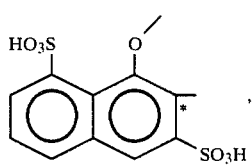

-continued

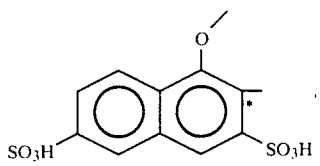

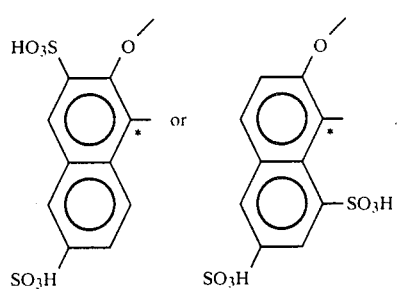

5. A mixture according to claim 4 consisting essentially of
(i) a complex wherein

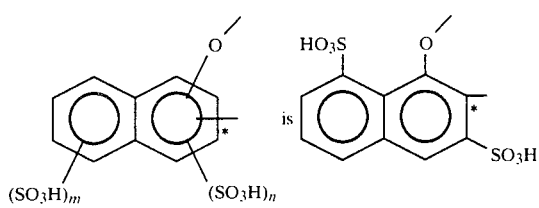

or a water-soluble salt thereof each cation of which is independently a non-chromophoric cation, and
(ii) a complex wherein

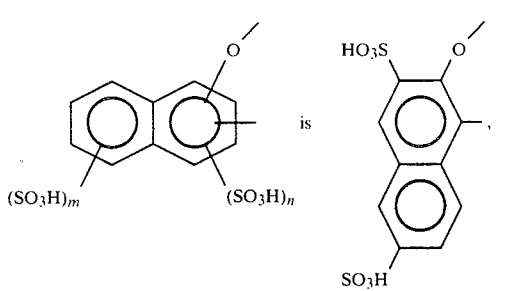

or a water-soluble salt thereof each cation of which is independently a non-chromophoric cation, wherein the ratio of (i) to (ii) is 85:15 to 15:85 by weight.

6. A mixture according to claim 1 containing
(i) a complex wherein X is chloro, or a water-soluble salt thereof each cation of which is independently a non-chromophoric cation, and
(ii) a complex wherein X is hydroxy, or a water-soluble salt thereof each cation of which is independently a non-chromophoric cation.

7. A mixture according to claim 6 wherein each cation is independently lithium, sodium, potassium, ammonium, methylammonium, dimethylammonium, trimethylammonium, tetramethylammonium, triethylammonium, ethanolammonium, diethanolammonium or triethanolammonium.

8. A mixture according to claim 6 wherein the ratio of (i) to (ii) is 9:1 to 7:3 by weight.

9. A mixture according to claim 6 wherein (i) and (ii) have identical

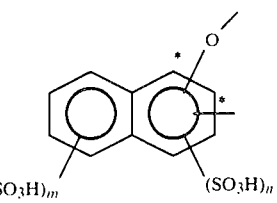

groups.

10. A mixture according to claim 9 wherein each

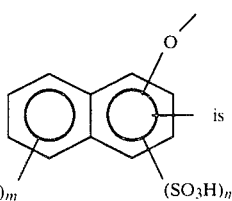

is

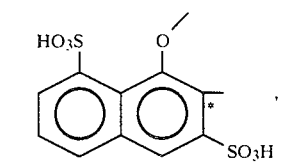

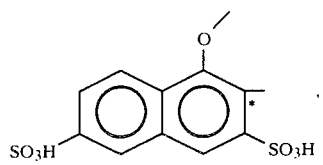

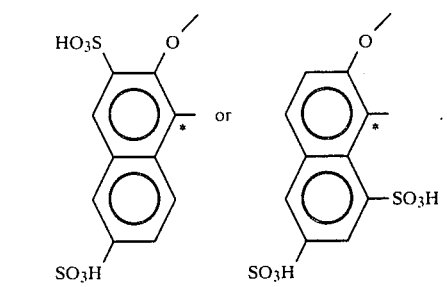

11. A mixture according to claim 10 wherein the ratio of (i) to (ii) is 9:1 to 7:3 by weight.

12. A mixture according to claim 11 wherein each cation is independently lithium, sodium, potassium, ammonium, methylammonium, dimethylammonium, trimethylammonium, tetramethylammonium, triethylammonium, ethanolammonium, diethanolammonium or triethanolammonium.

13. A mixture according to claim 12 wherein each

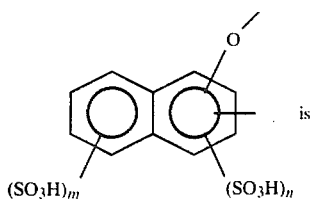

is

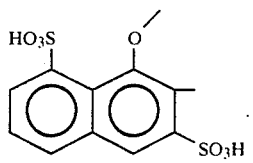

14. A process of dyeing or printing an hydroxy group- or nitrogen-containing organic substrate comprising applying to a hydroxy group- or nitrogen-containing organic substrate, as a dyeing or printing agent, a complex of the formula

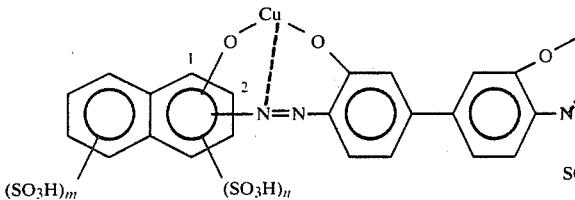

or a water-soluble salt thereof each cation of which is independently a non-chromophoric cation, wherein X is chloro or hydroxy,
m is 1 or 2, and
n is 0 or 1,
with the proviso that m+n is 2, with the proviso that one of the asterisked bonds is in the 1-position and the other asterisked bond is in the 2-position, or a mixture of such complexes or salts.

15. A process according to claim 14 wherein the substrate is cotton or a blend of cotton and another textile fiber.

16. A process according to claim 14 wherein the dyeing or printing agent is a mixture containing
  (i) a complex wherein X is chloro, or a water-soluble salt thereof each cation of which is independently a non-chromophoric cation, and
  (ii) a complex wherein X is hydroxy, or a water-soluble salt thereof each cation of which is independently a non-chromophoric cation.

17. A process for dyeing or printing hydroxy group- or nitrogen-containing textile fibers comprising dyeing or printing hydroxy group- or nitrogen-containing textile fibers with a complex of the formula

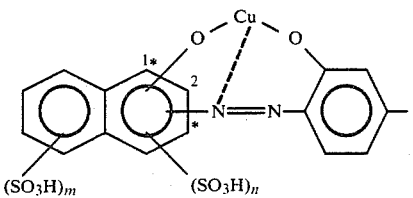

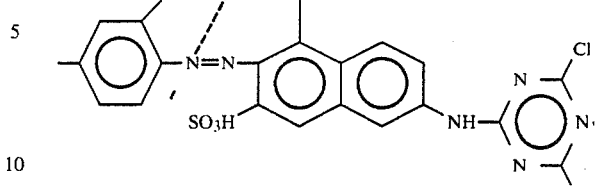

or a water-soluble salt thereof each cation of which is independently a non-chromophoric cation, wherein X is chloro or hydroxy,
m is 1 or 2, and
n is 0 or 1,
with the proviso that m+n is 2,
with the proviso that one of the asterisked bonds is in the 1-position and the other asterisked bond is in the 2-position, or a mixture of such complexes or salts, and subsequently treating the dyed or printed hydroxy group- or nitrogen-containing textile fibers at a pH of 7 to 14 with a polymeric polybasic amino compound.

18. A process according to claim 17 wherein the dyeing or printing agent is a mixture containing
  (i) a complex wherein X is chloro, or a water-soluble salt thereof each cation of which is independently a non-chromophoric cation, and
  (ii) a complex wherein X is hydroxy, or a water-soluble salt thereof each cation of which is independently a non-chromophoric cation.

19. A process according to claim 18 wherein the polymeric polybasic amino compound is the reaction product of a compound of the formula

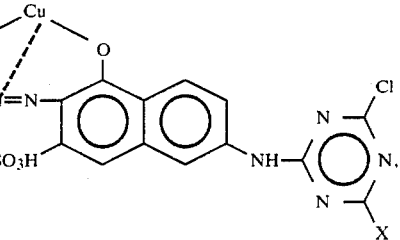

wherein
each R is independently hydrogen, $C_{1-10}$alkyl or $C_{1-10}$alkyl monosubstituted by hydroxy, $C_{1-4}$alkoxy or cyano,
$X_o$ or, when p>1, each $X_o$ independently is —O—, —S— or —NR—, wherein R is as defined above,
Z or, when p>0, each Z independently is $C_{2-4}$alkylene or $C_{2-4}$hydroxyalkylene, and
p is 0 to 100,
with the proviso that the compound contains at least one reactive —NH— or —NH$_2$ group, with cyanamide, dicyandiamide, guanidine or biguanide.

20. A process according to claim 19 wherein the polymeric polybasic amino compound is a reaction product of diethylene triamine or triethylene tetramine with dicyandiamide.

* * * * *